US012508876B2

(12) United States Patent
Suzuki

(10) Patent No.: US 12,508,876 B2
(45) Date of Patent: Dec. 30, 2025

(54) HEAT MANAGEMENT SYSTEM

(71) Applicant: TOYOTA JIDOSHA KABUSHIKI KAISHA, Toyota (JP)

(72) Inventor: Tomoaki Suzuki, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 99 days.

(21) Appl. No.: 18/394,035

(22) Filed: Dec. 22, 2023

(65) Prior Publication Data

US 2024/0300296 A1 Sep. 12, 2024

(30) Foreign Application Priority Data

Mar. 9, 2023 (JP) ................. 2023-036628

(51) Int. Cl.
*B60H 1/00* (2006.01)
(52) U.S. Cl.
CPC ..... *B60H 1/00914* (2013.01); *B60H 1/00278* (2013.01); *B60H 1/00792* (2013.01)
(58) Field of Classification Search
CPC ............ B60H 1/00914; B60H 1/00278; B60H 1/00792
USPC ........................................................ 165/202
See application file for complete search history.

(56) References Cited

U.S. PATENT DOCUMENTS

2022/0410652 A1 12/2022 Hayase et al.
2024/0133470 A1 4/2024 Chan et al.

FOREIGN PATENT DOCUMENTS

| CN | 215950469 U | 3/2022 | |
|---|---|---|---|
| CN | 115179717 | * 10/2022 | |
| JP | 2020-017358 A | 1/2020 | |
| KR | 10-2020-0094926 A | 8/2020 | |
| WO | 2020/159065 A1 | 8/2020 | |
| WO | WO2022262083 A1 | * 12/2022 | ......... B60H 1/00914 |

* cited by examiner

*Primary Examiner* — Davis D Hwu
(74) *Attorney, Agent, or Firm* — SoraIP, Inc.

(57) ABSTRACT

The heat management system includes a power storage device in a first channel, a drive device in a second channel, a radiator in a third channel, a chiller device in a fourth channel, and a switching device. In a heat management system, when making the temperature of a plurality of power storage cells uniform, a first connected channel in which a first channel and a fourth channel are connected, and a second channel and a third channel are connected. The switching device is controlled so that the second connected channels that have been connected are separated from each other and become independent.

4 Claims, 7 Drawing Sheets

1ST CONTINUOUS PATTERN

2ND CONTINUOUS PATTERN

HEAT MANAGEMENT SYSTEM

CROSS-REFERENCE TO RELATED APPLICATION

This application claims priority to Japanese Patent Application No. 2023-036628 filed on Mar. 9, 2023, incorporated herein by reference in its entirety.

BACKGROUND

1. Technical Field

The present disclosure relates to a heat management system.

2. Description of Related Art

Japanese Unexamined Patent Application Publication No. 2020-017358 (JP 2020-017358 A) discloses an electrified vehicle equipped with an onboard battery including a plurality of battery cells. The battery cells are cooled by a coolant fed from a coolant pump.

SUMMARY

Now, depending on a layout of the onboard battery, the coolant pump, and so forth, there are cases in which heat from a drive device, for example, is transferred to the coolant. Also, even within the same onboard battery, different parts thereof may have different susceptibility to heat (liability to temperature change). For this reason, when the coolant flowing through the onboard battery receives heat externally (from such as the drive device or the like) or the like, for example, the temperature of the battery cells may not rise equally, due to the heat that the coolant receives externally. Accordingly, there is demand for a heat management system that can easily equalize the temperature of multiple battery cells (power storage cells).

The present disclosure has been made in order to solve the above problem, and an object thereof is to provide a heat management system that can easily equalize the temperature of multiple power storage cells.

A heat management system according to one aspect of the present disclosure includes
- a first channel, a second channel, a third channel, and a fourth channel, through which a heat transfer medium is flowable,
- a power storage device that performs heat exchange with the heat transfer medium in the first channel and is made up of a plurality of power storage cells,
- a drive device configured to perform heat exchange with the heat transfer medium in the second channel and generate driving force,
- a radiator provided on the third channel,
- a chiller device provided on the fourth channel, and
- a switching device configured to switch a connection state among the first channel, the second channel, the third channel, and the fourth channel.

A channel circuit, in which a first connected channel, in which the first channel and the fourth channel are connected, and a second connected channel, in which the second channel and the third channel are connected, are separated and isolated from each other, serves as an isothermal circuit.

When equalizing temperature of the power storage cells, the switching device creates the isothermal circuit, and also circulates the heat transfer medium over the first connected channel.

In the heat management system according to one aspect of the present disclosure, as described above, when equalizing temperature the power storage cells, the first connected channel in which the first channel and the fourth channel are connected, and the second connected channel in which the second channel and the third channel are connected, are created. Thus, the drive device and the radiator, which tend to exchange heat with the power storage device, can be separated from the power storage device. As a result, transfer of heat from the drive device or the like to the heat transfer medium in the first channel can be suppressed, and accordingly the temperature of the power storage cells can be easily equalized. Also, the heat generated at the drive device can be dissipated by the radiator.

In the heat management system according to the above aspect, preferably, the chiller device is connected to each of a refrigeration cycle provided with a compressor, and the fourth channel.

Under conditions in which a refrigerant of the refrigeration cycle does not flow through the chiller device, the switching device creates the isothermal circuit to equalize the temperature of the power storage cells.

According to this configuration, heat exchange of the heat transfer medium flowing through the first connected channel in the chiller device can be suppressed. As a result, the temperature of the power storage cells can be more easily equalized.

The heat management system according to the above aspect preferably includes
- a pump that is provided in the fourth channel and that circulates the heat transfer medium. The heat management system runs the pump when the switching device creates the isothermal circuit to equalize the temperature of the power storage cells. According to this configuration, the heat transfer medium can flow over the first connected channel in which the power storage device is provided. As a result, the heat of each of the power storage cells is equalized by the heat transfer medium flowing, and accordingly the temperature of the power storage cells can be equalized even more easily.

In the heat management system according to the above aspect, preferably, the power storage cells are arrayed in a predetermined direction.

The heat management system includes
- a first temperature sensor provided at a middle portion of the power storage device in the predetermined direction, and
- a second temperature sensor provided at an end portion of the power storage device in the predetermined direction.

When a difference between a detection value of the first temperature sensor and a detection value of the second temperature sensor is greater than a first threshold value, the switching device creates the isothermal circuit.

According to this configuration, the difference between the first temperature sensor and the second temperature sensor becomes great when the temperature of the power storage cells is not equalized, and accordingly the temperature of the power storage cells can be quickly equalized when the temperature of the power storage cells is not equalized. Note that the first threshold value may be calculated as appropriate using a trained model generated by machine learning technology such as deep learning or the like.

In this case, preferably the heat management system includes
a medium temperature sensor that detects temperature of the heat transfer medium in the second channel.

In a situation in which the power storage device is at an elevated temperature, the switching device creates the isothermal circuit when each of the detection value of the first temperature sensor and the detection value of the second temperature sensor is within a predetermined temperature range, and also a detection value of the medium temperature sensor is higher than a second threshold value that is higher than the temperature range.

According to this configuration, temperature equalizing control can be performed after the temperature of the power storage device becomes relatively high. Further, when the temperature of the heat transfer medium in the second channel becomes high, the heat of the heat transfer medium in the second channel can be externally dissipated by the radiator.

According to the present disclosure, temperature of multiple power storage cells that make up a power storage device can be easily equalized.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
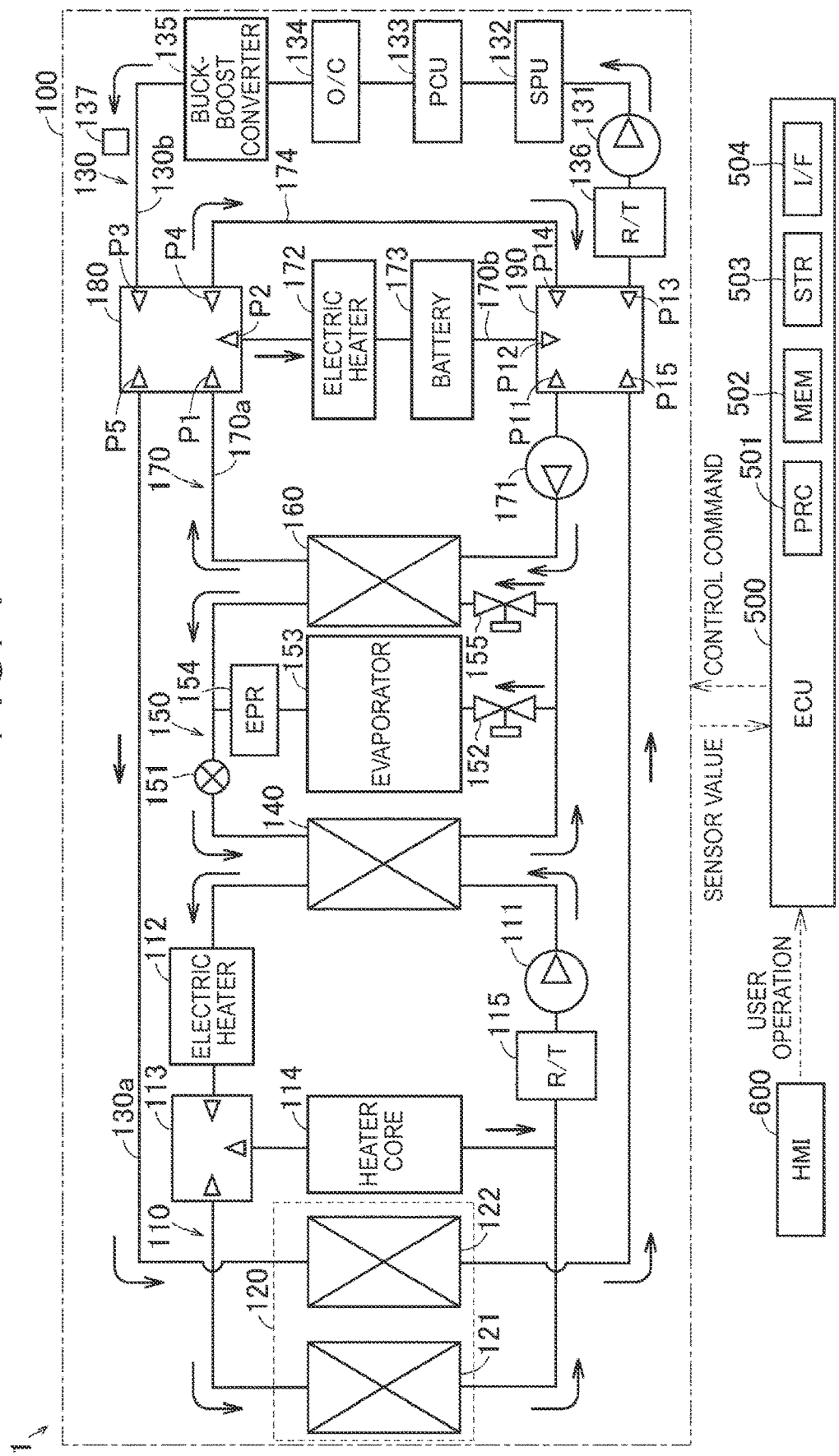
FIG. 1 is a diagram showing the configuration of a heat management system according to a first embodiment.

Hereinafter, a first embodiment of the present disclosure will be described in detail with reference to the drawings. In the drawings, the same or corresponding parts are given the same reference numerals, and the description thereof will not be repeated.

In the following, the heat management system according to the present disclosure is mounted on, for example, an electrified vehicle. However, the application of the heat management system according to the present disclosure is not limited to vehicles.

First Embodiment

Overall Structure

As shown in FIG. 1, the heat management system 1 includes a thermal management circuit 100, an electronic control unit (ECU) 500, and a human machine interface (HMI) 600.

The thermal management circuit 100 is configured so that a heat transfer medium flows therethrough. The thermal management circuit 100 includes, for example, a high temperature circuit 110, a radiator 120, a low temperature circuit 130, a capacitor 140, a refrigeration cycle 150, a chiller 160, a battery circuit 170, a five-way valve 180, and a five-way valve 190, including. Note that each of the five-way valve 180 and the five-way valve 190 is an example of a "switching device" of the present disclosure. Moreover, the chiller 160 is an example of a "chiller device" of the present disclosure.

High temperature circuit 110 includes, for example, a water pump (W/P) 111, an electric heater 112, a three-way valve 113, a heater core 114, and a reservoir tank (R/T) 115.

Radiator 120 is connected (i.e., shared) to both hot circuit 110 and cold circuit 130. Radiator 120 includes a high temperature radiator 121 provided in high temperature circuit 110 and a low temperature radiator 122 provided in low temperature circuit 130. In the low temperature radiator 122, heat exchange is performed between the heat transfer medium flowing through the low temperature circuit 130 and the outside air. Note that the low-temperature radiator 122 is an example of a "radiator" in the present disclosure.

The low temperature circuit 130 includes, for example, a water pump 131, a Smart Power Unit (SPU) 132, a Power Control Unit (PCU) 133, an oil cooler (O/C) 134, a buck-boost converter 135, a reservoir tank 136, and a heat transfer medium temperature sensor 137. Note that the PCU 133 and the oil cooler 134 are examples of a "drive device" in the present disclosure. Further, the heat transfer medium temperature sensor 137 is an example of a "medium temperature sensor" of the present disclosure.

Capacitor 140 is connected to both high temperature circuit 110 and refrigeration cycle 150. Refrigeration cycle 150 includes, for example, a compressor 151, an expansion valve 152, an evaporator 153, an Evaporative Pressure Regulator (EPR) 154, and an expansion valve 155.

Chiller 160 is connected to both refrigeration cycle 150 and battery circuit 170 (channel 170a described below). In the chiller 160, the heat transfer medium flowing through the battery circuit 170 and the medium circulating in the refrigeration cycle 150 perform heat exchange. The battery circuit 170 includes, for example, a water pump 171, an electric heater 172, a battery 173, a bypass channel 174, a first temperature sensor 175 (see FIG. 2), and a second temperature sensor 176 (see FIG. 2). Note that the battery 173 and the water pump 171 are examples of a "power storage device" and a "pump" of the present disclosure, respectively.

Each of five-way valve 180 and five-way valve 190 is connected to low temperature circuit 130 and battery circuit 170.

ECU 500 controls thermal management circuit 100. ECU 500 includes a processor 501, memory 502, storage 503, and interface 504.

The HMI 600 is a display with a touch panel, an operation panel, a console, etc. HMI 600 accepts user operations for controlling heat management system 1. HMI 600 outputs a signal indicating a user operation to ECU 500.

The heat transfer medium (usually hot water) circulating in the high-temperature circuit 110 passes through a first path of water pump 111—condenser 140—electric heater 112—three-way valve 113—heater core 114—reservoir tank 115—water pump 111, and water pump 111—It flows through one or both of the following: condenser 140—electric heater 112—three-way valve 113—high temperature radiator 121—reservoir tank 115—second path of water pump 111.

The heat transfer medium (cooling liquid) circulating in the low temperature circuit 130 includes: water pump 131—SPU 132—PCU 133—oil cooler 134—step-up/down converter 135—five-way valve 180—low-temperature radiator 122—five-way valve 190—reservoir tank 136—Flows through the path of the water pump 131.

Water pump 131 circulates a heat transfer medium within low temperature circuit 130 according to control instructions from ECU 500. SPU 132 controls charging and discharging of battery 173 according to control commands from ECU 500. PCU 133 converts DC power supplied from battery 173 into AC power according to control commands from ECU 500, and supplies the AC power to a motor (not shown) built into the transaxle.

Each of five-way valve 180 and five-way valve 190 switches the path of the heat transfer medium in low temperature circuit 130 and battery circuit 170 in accordance with control commands from ECU 500. The low temperature radiator 122 is arranged near the high temperature radiator 121 and performs heat exchange with the high temperature radiator 121.

The heat transfer medium temperature sensor 137 detects the temperature of the heat transfer medium in a channel (channel 130b described later) in which the PCU 133 and the like are provided. For example, the heat transfer medium temperature sensor 137 detects the temperature of the heat transfer medium flowing between the step-up/down converter 135 and the five-way valve 180.

The heat transfer medium (gas-phase refrigerant or liquid-phase refrigerant) circulating in the refrigeration cycle 150 flows through one/both of a first path of compressor 151—condenser 140—expansion valve 152—evaporator 153—EPR 154—compressor 151, and a second path of compressor 151—condenser 140—expansion valve 155—chiller 160—compressor 151.

The five-way valve 180 is provided with five ports P1 to P5. The five-way valve 190 is provided with five ports P11 to P15.

The heat transfer medium (cooling liquid) of the battery circuit 170 is transmitted through a first path of water pump 171—chiller 160—five-way valve 180—electric heater 172—battery 173—five-way valve 190—water pump 171, and water pump 171—chiller 160—five-way valve 180—bypass channel 174—five-way valve 190—second path of water pump 171.

Water pump 171 circulates a heat transfer medium within battery circuit 170 according to control commands from ECU 500. Chiller 160 cools the heat transfer medium circulating in battery circuit 170 by heat exchange between the heat transfer medium circulating in refrigeration cycle 150 and the heat transfer medium circulating in battery circuit 170. Electric heater 172 heats the heat transfer medium according to control instructions from ECU 500. The battery 173 supplies power for running to a motor built into the transaxle. Battery 173 may be heated using electric heater 172 or cooled using chiller 160. Bypass channel 174 is provided so that the heat transfer medium bypasses electric heater 172 and battery 173. When the heat transfer medium flows through the bypass channel 174, temperature changes in the heat transfer medium due to heat absorption/radiation between the heat transfer medium and the battery 173 can be suppressed.

Figure 2:
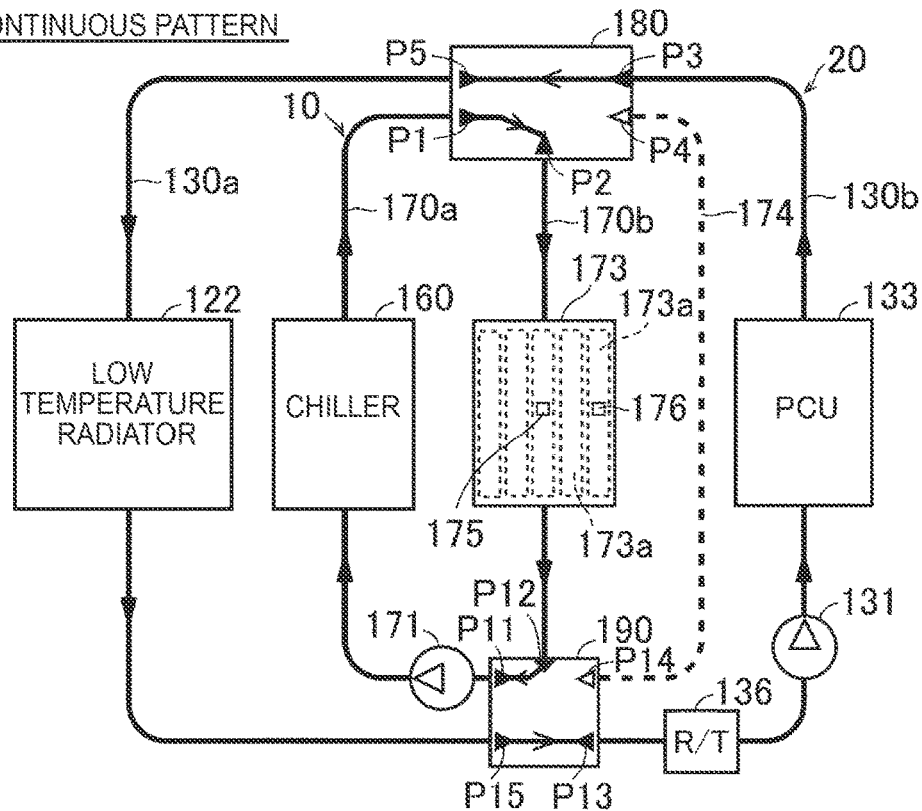
FIG. 2 is a diagram showing a first communication pattern of the thermal management circuit according to the first embodiment.

As shown in FIG. 2, battery 173 includes a plurality of (five in FIG. 2) power storage cells 173a. The plurality of power storage cells 173a are arranged in a predetermined direction. For example, in the example shown in FIG. 2, the plurality of power storage cells 173a are arranged in a direction perpendicular to the flow direction of the heat transfer medium flowing through the battery 173. Note that the arrangement direction and number of power storage cells 173a are not limited to the example shown in FIG. 2.

The first temperature sensor 175 is provided at the middle portion of the batteries 173 in the arrangement direction. Therefore, the first temperature sensor 175 detects the temperature of the central power storage cell 173a among the plurality of power storage cells 173a. The second temperature sensor 176 is provided at an end portion (one end) of the battery 173 in the arrangement direction. Therefore, the second temperature sensor 176 detects the temperature of the end portion side power storage cell 173a among the plurality of power storage cells 173a. ECU 500 can perform temperature equalization control to make the temperature of the plurality of power storage cells 173a uniform. The temperature equalization control will be explained in detail later. Note that in general, heat accumulates more easily at the end portion of a battery than at the center.

The battery 173 is provided in the channel 170b of the battery circuit 170. The battery 173 performs heat exchange with the heat transfer medium in the channel 170b. Channel 170b is in thermal contact with battery 173. The channel 170b is a channel that connects port P2 of the five-way valve 180 and port P12 of the five-way valve 190. Note that the channel 170b is an example of the "first channel" of the present disclosure.

The low temperature radiator 122 is provided in the channel 130a of the low temperature circuit 130. The channel 130a is a channel that connects port P5 of the five-way valve 180 and port P15 of the five-way valve 190. Note that the channel 130a is an example of the "third channel" of the present disclosure.

The PCU 133, oil cooler 134, etc. are provided in the channel 130b of the low temperature circuit 130. The PCU 133, oil cooler 134, etc. perform heat exchange with the heat transfer medium in the channel 130b. Channel 130b is in thermal contact with SPU 132, PCU 133, oil cooler 134, and step-up/down converter 135. The channel 130b is a channel that connects the port P3 of the five-way valve 180 and the port P13 of the five-way valve 190. Note that the channel 130b is an example of a "second channel" in the present disclosure.

Chiller 160 and water pump 171 are each provided in channel 170a of battery circuit 170. The channel 170a is a channel that connects the port P1 of the five-way valve 180 and the port P11 of the five-way valve 190. Note that the channel 170a is an example of the "fourth channel" of the present disclosure.

Figure 3:
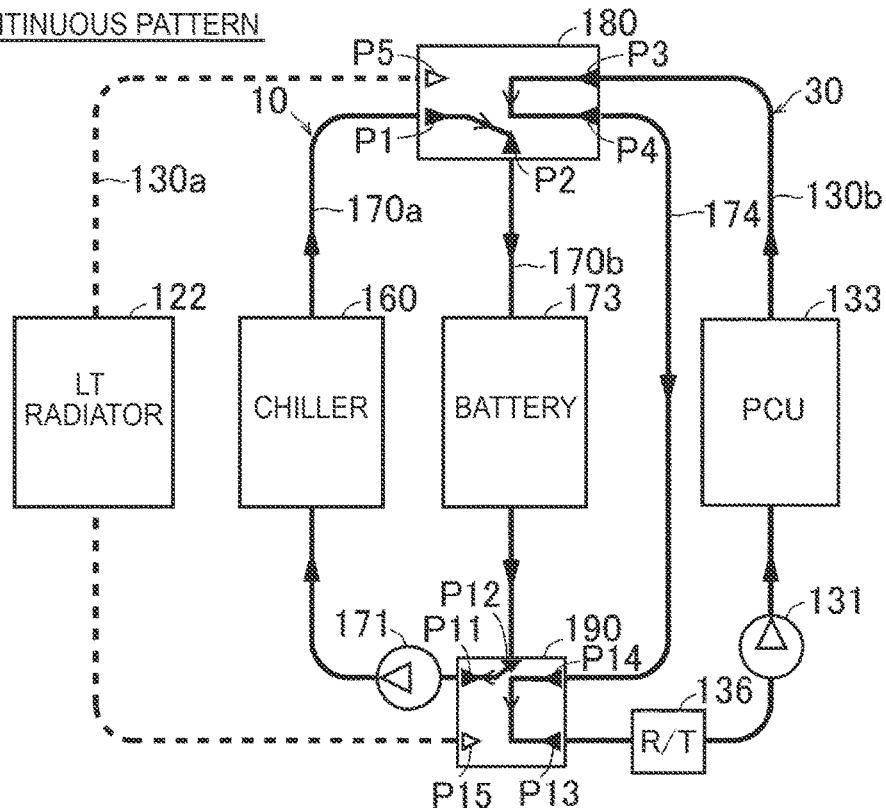
FIG. 3 is a diagram showing a second communication pattern of the thermal management circuit according to the first embodiment.

FIGS. 2 and 3 are conceptual diagrams showing outlines of a first communication pattern and a second communication pattern of the thermal management circuit 100 formed by controlling the five-way valve 180 and the five-way valve 190, respectively. Note that the first communication pattern is an example of an "isothermal circuit" of the present disclosure.

In the first communication pattern, the five-way valve 180 forms a path that communicates between ports P1 and P2 and a path that communicates between ports P3 and P5. Furthermore, the five-way valve 190 forms a path that communicates between ports P11 and P12, and a path that communicates between ports P13 and P15.

As a result, a closed circuit 10 is formed in which the channel 170b and the channel 170a are connected. Further, a closed circuit 20 is formed in which the channel 130a and the channel 130b are connected. The closed circuit 10 and the closed circuit 20 are separated and independent from each other. Note that the closed circuit 10 and the closed circuit 20 are examples of the "first connected channel" and the "second connected channel" of the present disclosure, respectively.

In the second communication pattern, the five-way valve 180 forms a path that communicates between ports P1 and P2 and a path that communicates between ports P3 and P4. Furthermore, the five-way valve 190 forms a path that communicates between ports P11 and P12, and a path that communicates between ports P13 and P14.

As a result, a closed circuit 30 is formed in which the channel 130b and the bypass channel 174 are connected. Note that even in this case, the closed circuit 10 is formed.

Here, even within the same battery 173, different parts of the battery 173 may have different susceptibility to heat. For this reason, for example, when the heat transfer medium flowing through the battery 173 obtains heat from the outside (PCU 133, etc.), the temperature of the plurality of power storage cells 173a may not be raised uniformly due to the heat obtained by the heat transfer medium from the outside. Therefore, a heat management system that can easily equalize the temperature of the plurality of power storage cells 173a is desired.

Accordingly, in the first embodiment of the present disclosure, the ECU 500 controls the five-way valve 180 and the five-way valve 190 to form the first flow pattern while controlling the temperature of the power storage cell 173a, and also controls the five-way valve 180 and the five-way valve 190 to form the first flow pattern and to release heat in the closed circuit 10. Circulate the heat transfer medium. Thereby, it is possible to suppress exchange of heat between the battery 173, the PCU 133, and the low-temperature radiator 122.

Control Method of Thermal Management Circuit

Figure 4:
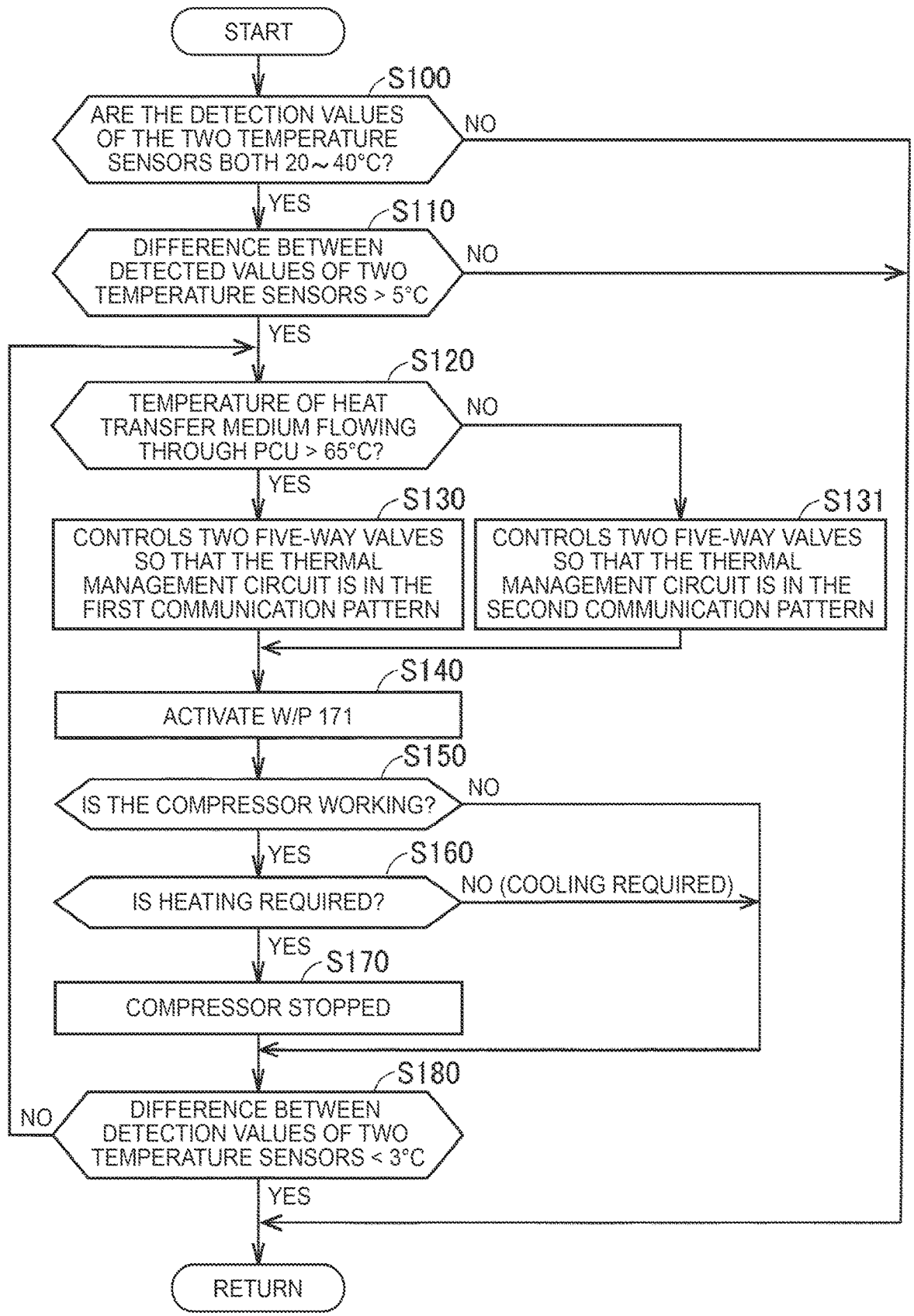
FIG. 4 is a flow diagram showing control of the heat management system according to the first embodiment.

A method of controlling the heat management system 1 will be explained with reference to the flow diagram of FIG. 4. Note that the flow shown in FIG. 4 is just an example, and the control in the present disclosure is not limited to the example shown in FIG. 4. Further, the control in FIG. 4 is executed at predetermined intervals (for example, every 10 minutes).

In S100, ECU 500 determines whether each of the detection values of first temperature sensor 175 and second temperature sensor 176 is within the range of 20° C. to 40° C. If the detection values of the two temperature sensors are both within the above range (Yes in S100), the process proceeds to S110. If any one of the detection values of the two temperature sensors is not within the above range (No in S100), the process ends. Note that 20° C. to 40° C. is an example of the "predetermined temperature range" of the present disclosure.

In S110, the ECU 500 determines whether the difference between the detected value of the first temperature sensor 175 and the detected value of the second temperature sensor 176 is greater than 5° C. If the difference is greater than 5° C. (Yes in S110), the process proceeds to S120. If the difference is 5° C. or less (No in S110), the process ends. Note that 5° C. is an example of the "first threshold" of the present disclosure.

In S120, the ECU 500 determines whether the temperature of the heat transfer medium detected by the heat transfer medium temperature sensor 137 and flowing through the channel 130b (flowing through the PCU 133 and the like) is higher than 65° C. If the temperature of the heat transfer medium is higher than 65° C. (Yes in S120), the process proceeds to S130. If the temperature of the heat transfer medium is 65° C. or lower (No in S120), the process proceeds to S131. Note that 65° C. is an example of the "second threshold" of the present disclosure.

In S130, ECU 500 controls each of five-way valve 180 and five-way valve 190 so that thermal management circuit 100 has the first communication pattern shown in FIG. 2. After that, the process proceeds to S140.

In S131, ECU 500 controls each of five-way valve 180 and five-way valve 190 so that thermal management circuit 100 adopts the second communication pattern shown in FIG. 3. After that, the process proceeds to S140.

In S140, ECU 500 operates water pump 171 provided in channel 170a. Thereby, the heat transfer medium circulates in the closed circuit 10. Note that when the first communication pattern is formed, the water pump 131 may be operated.

Here, in the first embodiment, the ECU 500 performs temperature equalization control of the power storage cell 173a under the condition that the refrigerant of the refrigeration cycle 150 does not flow through the chiller 160. As a result, in the chiller 160, heat exchange between the refrigerant of the refrigeration cycle and the heat transfer medium of the closed circuit 10 is not performed. Details will be explained with reference to S150 to S170.

In S150, ECU 500 determines whether compressor 151 (see FIG. 1) is operating. If the compressor 151 is operating (Yes in S150), the process advances to S160. If the compressor 151 is not operating (No in S150), the process proceeds to S180.

In S160, ECU 500 determines whether there is a request from the user of the electrified vehicle to activate the heating. If there is the above request (Yes in S160), the process proceeds to S170. If there is no such request (No in S160), the process proceeds to S180. Note that the case where there is no request is the case where there is a request for cooling by the user. In this case, the refrigerant in the refrigeration cycle 150 does not flow through the chiller 160 but flows through the evaporator 153.

In S170, ECU 500 stops compressor 151. In this case, the refrigerant does not circulate in the refrigeration cycle 150. Therefore, heating control is performed by using the high temperature circuit 110 (electric heater 112).

In S180, the ECU 500 determines whether the difference between the detected value of the first temperature sensor 175 and the detected value of the second temperature sensor 176 is smaller than 3° C. If the difference is smaller than 3° C. (Yes in S180), the process ends. If the difference is 3° C. or more (No in S180), the process returns to S120.

As described above, in the first embodiment, the ECU 500 controls the five-way valves 180 and 190 to form the first communication pattern and close the closed circuit 10 (see FIG. 2) during temperature equalization control of the power storage cell 173a. The heat transfer medium is circulated in the This suppresses exchange of heat between the battery 173 provided in the closed circuit 10, the PCU 133, the low-temperature radiator 122, and the like, so that the temperature of the plurality of power storage cells 173a can be easily equalized. Furthermore, by forming the first communication pattern, the heat of the PCU 133 and the like can be released to the outside by the low temperature radiator 122, so that the PCU 133 and the like can be easily cooled.

Second Embodiment

Overall Structure

Figure 5:
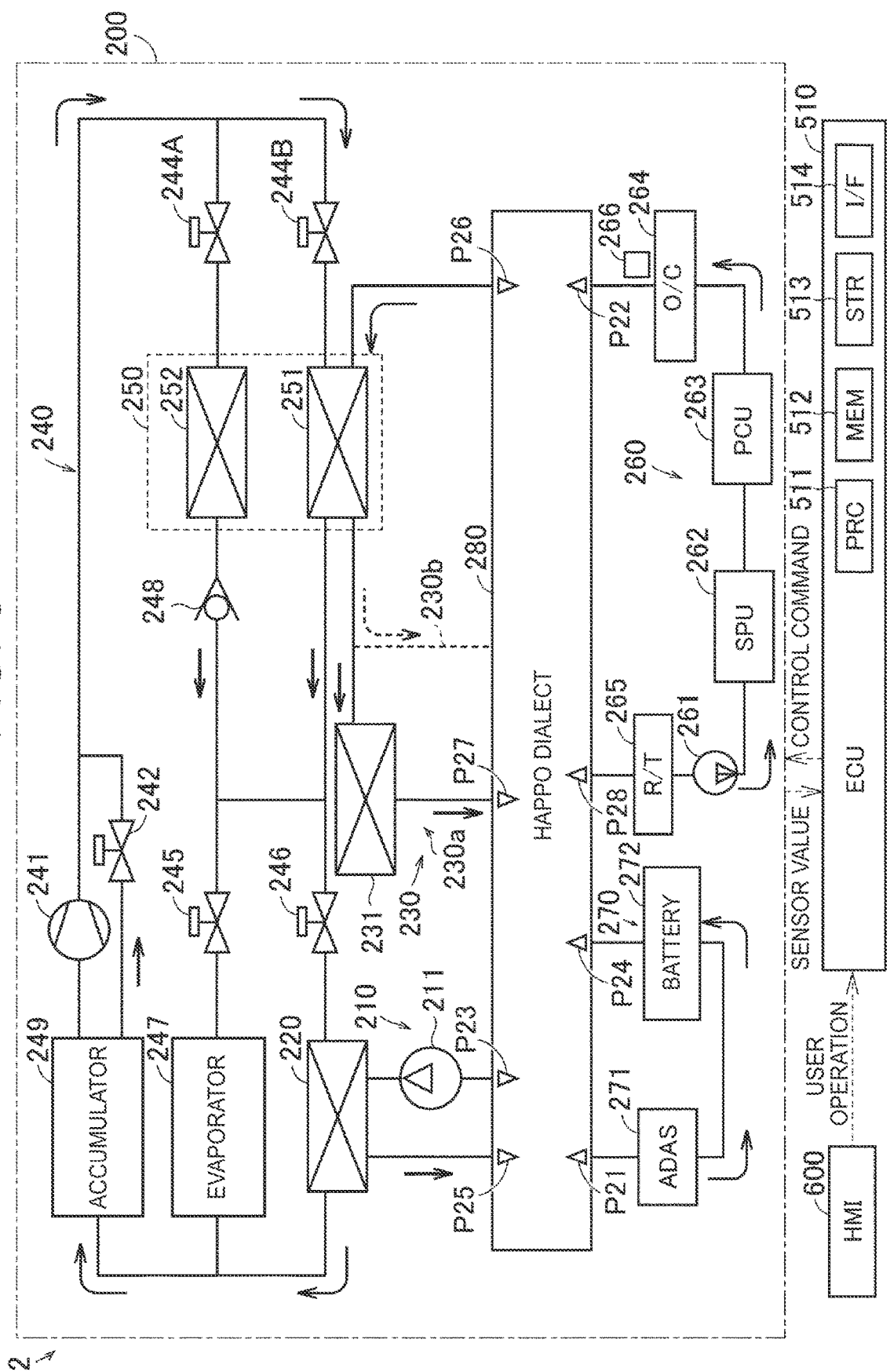
FIG. 5 is a diagram showing the configuration of a heat management system according to the second embodiment.

As shown in FIG. 5, the heat management system 2 includes a thermal management circuit 200 and an ECU 510.

Thermal management circuit 200 includes, for example, a chiller circuit 210, a chiller 220, a radiator circuit 230, a refrigeration cycle 240, a capacitor 250, a drive unit circuit 260, a battery circuit 270, and an eight-way valve 280. Note that the eight-way valve 280 and the chiller 220 are examples of a "switching device" and a "chiller device" of the present disclosure, respectively.

Chiller circuit 210 includes a water pump (W/P) 211. Chiller 220 is connected (shared) with both chiller circuit 210 and refrigeration cycle 240.

Radiator circuit 230 includes a radiator 231. Refrigeration cycle 240 includes, for example, a compressor 241, a solenoid valve 242, solenoid valves 244A, 244B, 245, 246, an evaporator 247, a check valve 248, and an accumulator 249. Condenser 250 includes a water-cooled condenser 251 and an air-cooled condenser 252. Water-cooled condenser 251 is connected to both refrigeration cycle 240 and radiator circuit 230.

Drive unit circuit 260 includes, for example, water pump 261, SPU 262, PCU 263, oil cooler 264, reservoir tank 265, and heat transfer medium temperature sensor 266. Note that the PCU 263 and the oil cooler 264 are examples of the "drive device" of the present disclosure. Further, the heat transfer medium temperature sensor 266 is an example of a "medium temperature sensor" of the present disclosure.

Figure 6:
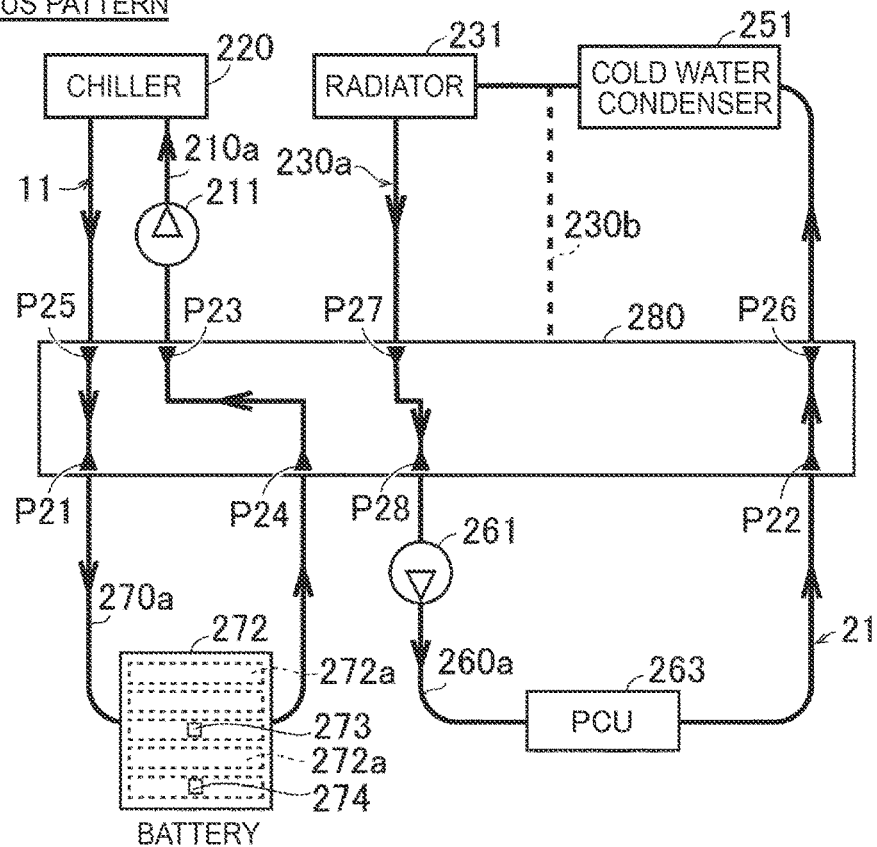
FIG. 6 is a diagram showing a first communication pattern of the thermal management circuit according to the second embodiment.

The battery circuit 270 includes, for example, Advanced Driver-Assistance Systems (ADAS) 271, a battery 272, a first temperature sensor 273 (see FIG. 6), and a second temperature sensor 274 (see FIG. 6). Note that the battery 272 is an example of a "power storage device" of the present disclosure.

ECU 510 controls thermal management circuit 200. ECU 510 includes a processor 511, memory 512, storage 513, and interface 514.

Eight-way valve 280 includes eight ports P21 to P28. The eight-way valve 280 is connected to the chiller circuit 210, the radiator circuit 230, the drive unit circuit 260, and the battery circuit 270.

The heat transfer medium circulating in the chiller circuit 210 flows through a path of eight-way valve 280 (port P23), water pump 211, chiller 220, and eight-way valve 280 (port P25).

The heat transfer medium circulating in the radiator circuit 230 is distributed between the eight-way valve 280 (port P26), the water-cooled condenser 251, the bypass channel 230b, the first passage of the eight-way valve 280 (port P27), and the eight-way valve 280 (port P26)—water-cooled It flows through either one of the condenser 251, the radiator 231, and the second channel of the eight-way valve 280 (port P27). That is, the eight-way valve 280 is configured such that the port P27 can be connected to either the radiator 231 or the bypass channel 230b.

The heat transfer medium (gas-phase refrigerant or liquid-phase refrigerant) circulating in the refrigeration cycle 240 flows through one of the first route of compressor 241—solenoid valve 244A—air-cooled condenser 252—check valve 248—solenoid valve (expansion valve) 245—evaporator 247—accumulator 249—compressor 241, the second route of compressor 241—solenoid valve 244A—air-cooled condenser 252—check valve 248—solenoid valve (expansion valve) 246—chiller 220—accumulator 249—compressor 241, the third route of compressor 241—solenoid valve 244B—water cooled condenser 251—solenoid valve (expansion valve) 245—evaporator 247—accumulator 249—compressor 241, and the fourth route of compressor 241—solenoid valve 244B—water cooled condenser 251—solenoid valve 246—chiller 220—accumulator 249—compressor 241.

Compressor 241 compresses the gas phase refrigerant circulating through refrigeration cycle 240 according to control commands from ECU 510. The solenoid valve 242 is connected in parallel to the compressor 241 and adjusts the amount of gas phase refrigerant flowing into the compressor 241 according to a control command from the ECU 510. The solenoid valves 244 (244A, 244B) switch whether the gas phase refrigerant discharged from the compressor 241 flows into the water-cooled condenser 251 or the air-cooled condenser 252 according to a control command from the ECU 510. The water-cooled condenser 251 performs heat exchange between the gaseous refrigerant discharged from the compressor 241 and the heat transfer medium flowing through the radiator circuit 230. The air-cooled condenser 252 performs heat exchange with the air introduced into the vehicle cabin and produces warm air. The solenoid valve 245 restricts the flow of liquid phase refrigerant into the evaporator 247 according to a control command from the ECU 510. The solenoid valve 246 restricts the flow of liquid phase refrigerant into the chiller 220 according to a control command from the ECU 510. The solenoid valves 245 and 246 also have the function of expanding the liquid phase refrigerant. The accumulator 249 removes liquid phase refrigerant from the refrigerant in a gas-liquid mixed state, and suppresses the liquid phase refrigerant from being sucked into the compressor 241 when the refrigerant is not completely vaporized by the evaporator 247.

The heat transfer medium (cooling fluid) circulating through the drive unit circuit 260 is routed through the eight-way valve 280 (port P28), the reservoir tank 265, the water pump 261, the SPU 262, the PCU 263, the oil cooler 264, and the eight-way valve 280 (port P22).

The heat transfer medium temperature sensor 266 detects the temperature of the heat transfer medium in a channel (channel 260a to be described later) in which the PCU 263 and the like are provided.

The heat transfer medium (coolant) circulating in the battery circuit 270 flows through a path of eight-way valve 280 (port P21), ADAS 271, battery 272, and eight-way valve 280 (port P24).

As shown in FIG. 6, the chiller 220 is provided in the channel 210a of the chiller circuit 210. Channel 210a is a channel that connects port P23 and port P25 of eight-way valve 280. Note that the channel 210a is an example of the "fourth channel" of the present disclosure.

Radiator 231 is provided in channel 230a of radiator circuit 230. Further, the channel 230a includes a bypass channel 230b. Bypass channel 230b is provided to connect a portion between water-cooled condenser 251 and radiator 231 and eight-way valve 280. Note that the channel 230a is an example of the "third channel" of the present disclosure.

The PCU 263, oil cooler 264, etc. are provided in the channel 260a of the drive unit circuit 260. Channel 260a is a channel that connects port P28 and port P22 of eight-way valve 280. Note that the channel 260a is an example of a "second channel" in the present disclosure.

The battery 272 is provided in the channel 270a of the battery circuit 270. Channel 270a is a channel that connects port P21 and port P24 of eight-way valve 280. Note that the channel 270a is an example of the "first channel" of the present disclosure.

Battery 272 includes a plurality (five in FIG. 6) of power storage cells 272a. The plurality of power storage cells 272a is arranged, for example, in a direction perpendicular to the flow direction of the heat transfer medium. Note that the arrangement direction and number of power storage cells 272a are not limited to the example shown in FIG. 6.

The first temperature sensor 273 and the second temperature sensor 274 are provided at a middle portion and an end portion (one end) of the battery 272 in the arrangement direction, respectively.

Figure 7:
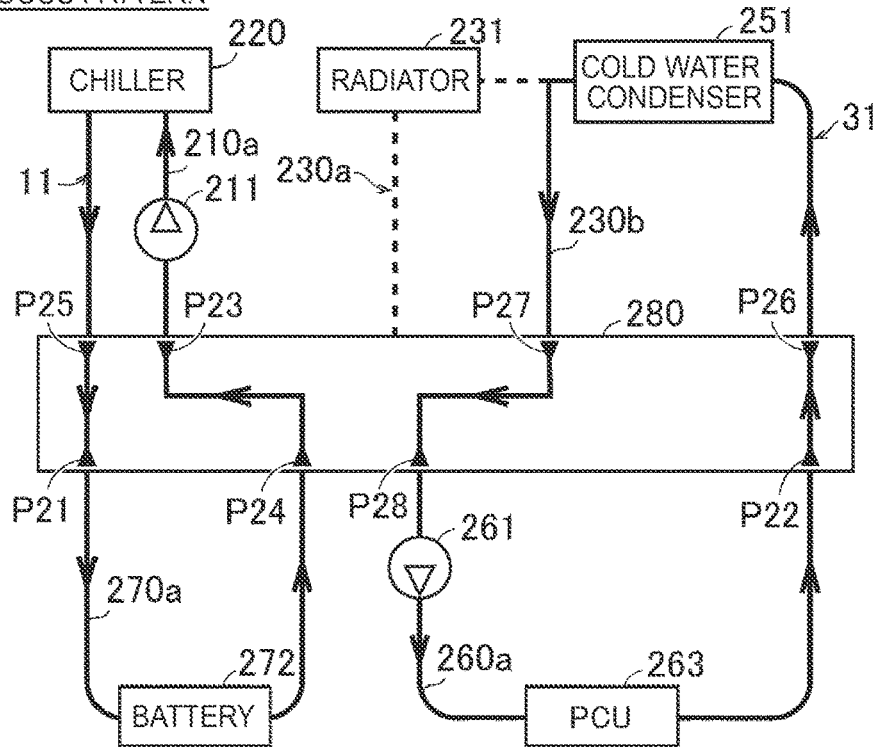
FIG. 7 is a diagram showing a second communication pattern of the thermal management circuit according to the second embodiment.

FIGS. 6 and 7 are conceptual diagrams showing the outline of the first communication pattern and the second communication pattern by the eight-way valve 280, respectively. Note that the first communication pattern is an example of an "isothermal circuit" of the present disclosure.

In the first communication pattern (see FIG. 6), a path that communicates between port P25 and port P21 and a path that communicates between port P23 and port P24 are formed. As a result, the heat transfer medium flows through the closed circuit 11 of water pump 211—chiller 220—eight-way valve 280—battery 272—eight-way valve 280—water pump 211. Note that the closed circuit 11 is an example of the "first connected channel" of the present disclosure.

Furthermore, in the first communication pattern, a path that communicates between port P22 and port P26 and a path that communicates between port P27 and port P28 are formed. Furthermore, in the first communication pattern, the radiator 231 is connected to the port P27. As a result, the heat transfer medium flows through the closed circuit 21 of water pump 261—PCU 263—eight-way valve 280—water-cooled condenser 251—radiator 231—eight-way valve 280—water pump 261. Note that the closed circuit 21 is an example of the "second connected channel" of the present disclosure.

The second communication pattern (see FIG. 7) differs from the first communication pattern in that the port P27 is connected not to the radiator 231 but to the bypass channel 230b. In this case, the heat transfer medium flows through the closed circuit 31 of water pump 261—PCU 263—eight-way valve 280—water-cooled condenser 251—bypass channel 230b—eight-way valve 280—water pump 261. Further, the closed circuit 11 is also formed in the second communication pattern.

Control Method of Thermal Management Circuit

Figure 8:
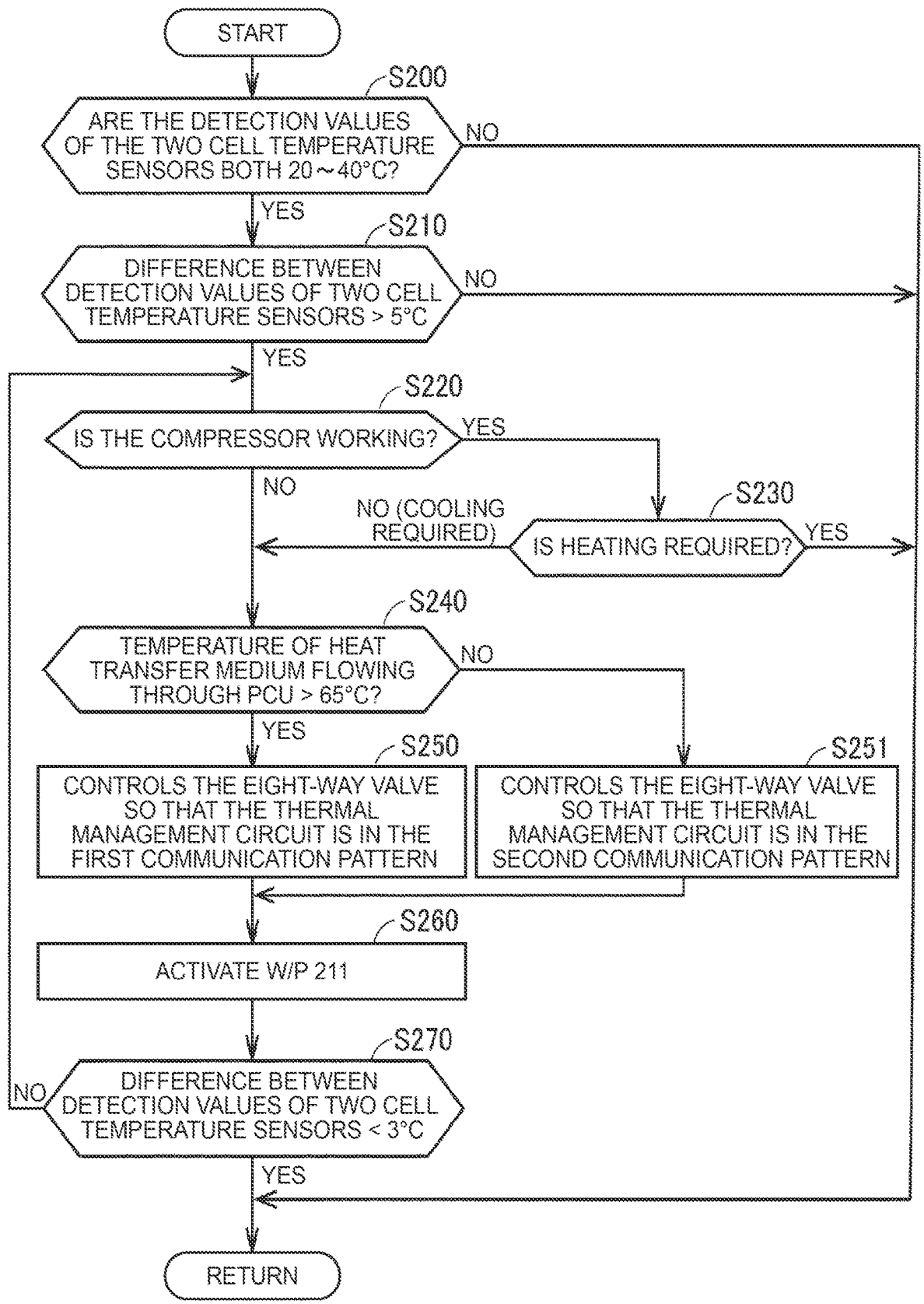
FIG. 8 is a flow diagram showing control of the heat management system according to the second embodiment.

A method of controlling the heat management system 2 will be explained with reference to the flow diagram of FIG. 8. Note that the description of steps similar to the control flow in the first embodiment will be simplified or omitted.

The processes of S200 and S210 are the same as S100 and S110 of the first embodiment, respectively.

In S220, ECU 510 determines whether compressor 241 is operating. If the compressor 241 is operating (Yes in S220), the process proceeds to S230. If the compressor 241 is not operating (No in S220), the process proceeds to S240.

In S230, the ECU 510 determines whether there is a request from the user of the electrified vehicle to activate the heating. If there is the above request (Yes in S230), the process ends. If there is no such request (No in S230), the process proceeds to S240. Note that the case where there is no request is the case where there is a request for cooling by the user.

In S240, the ECU 510 determines whether the temperature of the heat transfer medium in the channel 260a (the heat transfer medium flowing through the PCU 263 and the like) detected by the heat transfer medium temperature sensor 266 is higher than 65° C. If the temperature of the heat transfer medium is higher than 65° C. (corresponding to the "second threshold" of the present disclosure) (Yes in S240), the process proceeds to S250. If the temperature of the heat transfer medium is 65° C. or lower (No in S240), the process proceeds to S251.

In S250, the ECU 510 controls the eight-way valve 280 so that the thermal management circuit 200 has the first communication pattern shown in FIG. 6. The process then proceeds to S260.

In S251, the ECU 510 controls the eight-way valve 280 so that the thermal management circuit 200 adopts the second communication pattern shown in FIG. 7. The process then proceeds to S260.

In S260, the ECU 510 operates the water pump 211 provided in the channel 210a. Thereby, the heat transfer medium circulates in the closed circuit 11. Note that if the first communication pattern is formed, the water pump 261 may also be operated.

In S270, the ECU 510 determines whether the difference between the detected value of the first temperature sensor 273 and the detected value of the second temperature sensor 274 is smaller than 3° C. If the difference is smaller than 3° C. (Yes in S270), the process ends. If the difference is 3° C. or more (No in S270), the process returns to S220.

Figure 9:
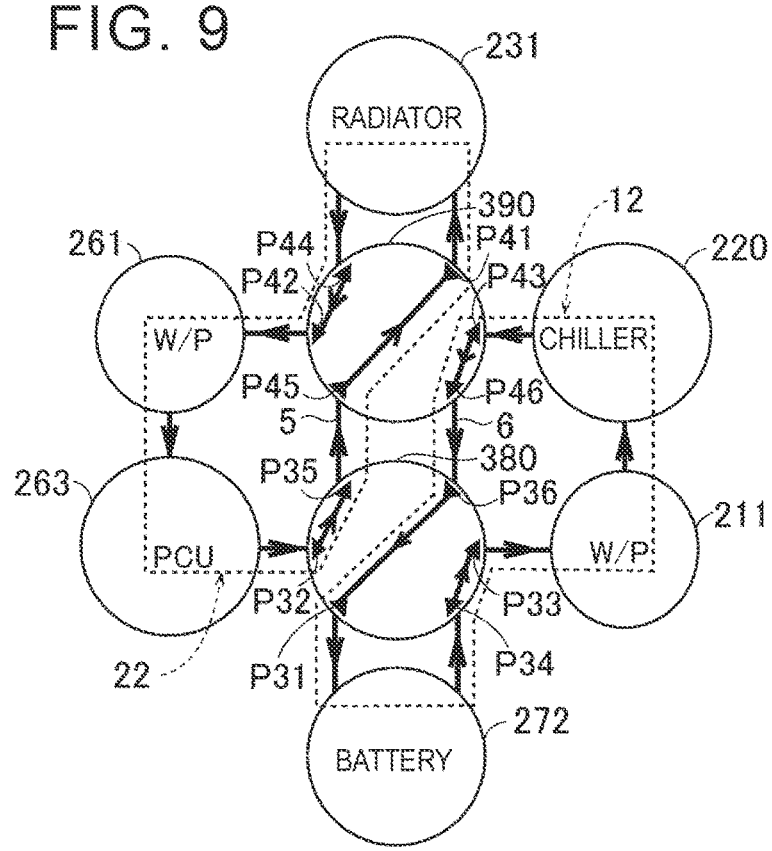
FIG. 9 is a schematic diagram showing the configuration of a heat management system according to a first modification of the first and second embodiments.

FIG. 9 shows an example in which a six-way valve 380 and a six-way valve 390 are used as the switching devices. The six-way valve 380 includes six ports P31 to P36. Moreover, the six-way valve 390 includes six ports P41 to P46. Port P35 of the six-way valve 380 and port P45 of the six-way valve 390 are connected through the channel 5. Further, port P36 of the hexagonal valve 380 and port P46 of the hexagonal valve 390 are connected by the channel 6.

In the example shown in FIG. 9, the heat transfer medium is distributed to water pump 211—chiller 220—port P43—port P46—channel 6—port P36—port P31—battery 272—port P34—port P33—closed circuit 12 of water pump 211. Note that the closed circuit 12 is the "first connected channel" of the present disclosure.

Further, the heat transfer medium flows through the closed circuit 22 of water pump 261—PCU 263—port P32—port P35—channel 5—port P45—port P41—radiator 231—port P44—port P42—water pump 261. Note that although FIG. 9 shows an example in which the eight-way valve 280 in the configuration of the second embodiment is replaced with a six-way valve (380, 390), the five-way valve (180, 190) of the first embodiment is replaced with a six-way valve (380, 390). may be replaced with a hexagonal valve (380, 390). Further, the closed circuit 22 is an example of the "second connected channel" of the present disclosure.

Figure 10:
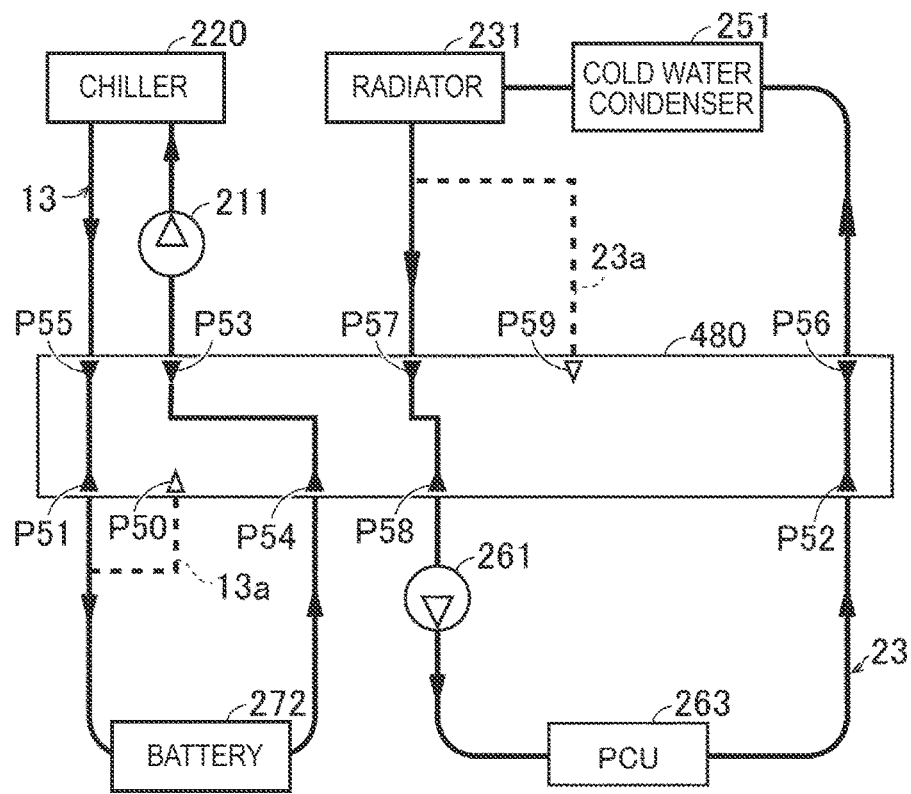
FIG. 10 is a schematic diagram showing the configuration of a heat management system according to a second modification of the first and second embodiments.

FIG. 10 shows an example in which a ten-way valve 480 is used as the switching device. Ten-way valve 480 includes ten ports P50 to P59.

In the example shown in FIG. 10, the heat transfer medium flows through the closed circuit 13 of water pump 211—chiller 220—port P55—port P51—battery 272—port P54—port P53—water pump 211. Note that a bypass channel 13a is provided between a portion between port P51 and battery 272 and port P50. Note that the closed circuit 13 is the "first connected channel" of the present disclosure.

Further, the heat transfer medium flows through the closed circuit 23 of water pump 261—PCU 263—port P52—port P56—water cooling condenser 251—radiator 231—port P57—port P58—water pump 261. Further, a bypass channel 23a is provided between the portion between the water-cooled condenser 251 and the radiator 231 and the port P59. Note that although FIG. 10 shows an example in which the eight-way valve 280 in the configuration of the second embodiment is replaced with a ten-way valve 480, the five-way valve (180, 190) of the first embodiment may be replaced with a ten-way valve 480. Further, the closed circuit 23 is an example of the "second connected channel" of the present disclosure.

In the first and second embodiments described above, when the detected values of the two temperature sensors are both 20 to 40° C. and the difference between the detected values of the two temperature sensors is greater than 5° C., the first communication pattern is Although an example has been shown in which temperature control is performed by forming a heat sink, the present disclosure is not limited thereto. For example, temperature equalization control may be performed based on the above-mentioned difference without considering the detected values of the two temperature sensors themselves.

In the first and second embodiments described above, an example was shown in which temperature equalization control is performed in a controlled state such that the refrigerant of the refrigeration cycle does not flow through the chiller, but the present disclosure is not limited to this. Temperature equalization control may be performed without controlling the flow of refrigerant to the chiller.

In the first and second embodiments described above, an example was shown in which a water pump provided in a channel in which a chiller is provided operates during temperature equalization control, but the present disclosure is not limited to this. A water pump that operates during temperature equalization control may be provided in the channel (170b, 270a) where the battery is provided.

In the first and second embodiments described above, an example was shown in which temperature uniformity control is performed based on the difference between the detection values of two temperature sensors, but the present disclosure is not limited to this. For example, temperature equalization control may be performed based on the detection values of (that is, three) temperature sensors provided at each of the middle portion and both ends of the battery. Further, temperature uniformity control may be performed based on something other than the difference between the detection values of the two temperature sensors (for example, the difference in the rate of change of the detection values of the two temperature sensors).

In the first and second embodiments described above, an example was shown in which the first communication pattern is formed when the temperature of the heat transfer medium flowing through the PCU etc. exceeds 65° C., but the present disclosure is not limited to this. For example, the first communication pattern may be formed even if the temperature of the heat transfer medium does not exceed 65° C.

Note that the configurations (processes) of the above-described embodiment and each of the modifications described above may be combined with each other.

The embodiment disclosed herein should be considered as illustrative and not restrictive in all respects. The scope of the present disclosure is shown by the claims, rather than the above embodiments, and is intended to include all modifications within the meaning and the scope equivalent to those of the claims.

What is claimed is:

1. A heat management system, comprising:
   a first channel, a second channel, a third channel, and a fourth channel, through which a heat transfer medium is flowable;
   a power storage device that performs heat exchange with the heat transfer medium in the first channel and is made up of power storage cells;
   a drive device configured to perform heat exchange with the heat transfer medium in the second channel and generate driving force;
   a radiator provided on the third channel;
   a chiller device connected to each of a refrigeration cycle provided with a compressor, and the fourth channel; and
   a switching device configured to switch a connection state among the first channel, the second channel, the third channel, and the fourth channel, wherein,
   with a channel circuit, in which a first connected channel, in which the first channel and the fourth channel are connected, and a second connected channel, in which the second channel and the third channel are connected, are separated and isolated from each other, serving as an isothermal circuit,
   when equalizing temperature of the power storage cells, the switching device creates the isothermal circuit, and also circulates the heat transfer medium over the first connected channel under conditions in which a refrigerant of the refrigeration cycle does not flow through the chiller device.

2. The heat management system according to claim 1, further comprising a pump that is provided in the fourth channel and that circulates the heat transfer medium, wherein the pump is run when the switching device creates the isothermal circuit to equalize the temperature of the power storage cells.

3. A heat management system, comprising:
   a first channel, a second channel, a third channel, and a fourth channel, through which a heat transfer medium is flowable;
   a power storage device that performs heat exchange with the heat transfer medium in the first channel and is made up of power storage cells arrayed in a predetermined direction, a drive device configured to perform heat exchange with the heat transfer medium in the second channel and generate driving force;
   a radiator provided on the third channel;
   a chiller device provided on the fourth channel;
   a switching device configured to switch a connection state among the first channel, the second channel, the third channel, and the fourth channel;
   a first temperature sensor provided at a middle portion of the power storage device in the predetermined direction; and
   a second temperature sensor provided at an end portion of the power storage device in the predetermined direction, wherein,
   with a channel circuit, in which a first connected channel, in which the first channel and the fourth channel are connected, and a second connected channel, in which the second channel and the third channel are connected, are separated and isolated from each other, serving as an isothermal circuit, when a difference between a detection value of the first temperature sensor and a detection value of the second temperature sensor is greater than a first threshold value, the switching device creates the isothermal circuit, and also circulates the heat transfer medium over the first connected channel to equalize temperature of the power storage cells.

4. The heat management system according to claim 3, further comprising a medium temperature sensor that detects temperature of the heat transfer medium in the second channel, wherein, in a situation in which the power storage device is at an elevated temperature, the switching device creates the isothermal circuit when each of the detection value of the first temperature sensor and the detection value of the second temperature sensor is within a predetermined temperature range, and also a detection value of the medium temperature sensor is higher than a second threshold value that is higher than the temperature range.

* * * * *